United States Patent
Ibrahim

(10) Patent No.: US 6,778,897 B2
(45) Date of Patent: Aug. 17, 2004

(54) ADAPTIVE CRUISE CONTROL SYSTEM AND STRATEGY

(75) Inventor: Faroog Abdel-Kareem Ibrahim, Dearborn, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/305,709

(22) Filed: Nov. 27, 2002

(65) Prior Publication Data

US 2004/0102889 A1 May 27, 2004

(51) Int. Cl.[7] ............ G06F 7/00; G06F 17/00; B60K 28/00
(52) U.S. Cl. ............ 701/96; 701/93; 180/170; 180/282; 340/903; 123/350
(58) Field of Search ............ 701/70, 302, 110, 701/96, 93, 94, 300, 301; 340/901, 435, 436, 903, 904, 905; 180/167–168, 271, 274, 282, 169, 170, 179; 123/350–351, 339.1, 339.14, 352; 342/69–70, 104–109, 461

(56) References Cited

U.S. PATENT DOCUMENTS

| | | | |
|---|---|---|---|
| 5,173,859 A | * 12/1992 | Deering | 701/70 |
| 5,938,714 A | 8/1999 | Satonaka | 701/96 |
| 6,185,499 B1 | * 2/2001 | Kinoshita et al. | 701/96 |
| 6,292,737 B1 | 9/2001 | Higashimata et al. | 701/96 |
| 6,324,465 B1 | 11/2001 | Teramura et al. | 701/96 |
| 6,330,507 B1 | 12/2001 | Adachi et al. | 701/96 |
| 6,339,740 B1 | * 1/2002 | Seto et al. | 701/96 |
| 6,370,470 B1 | 4/2002 | Yamamura et al. | 701/96 |
| 6,389,351 B1 | 5/2002 | Egawa et al. | 701/93 |
| 6,430,494 B1 | * 8/2002 | Inoue et al. | 701/96 |
| 6,496,771 B2 | * 12/2002 | Hattori et al. | 701/96 |
| 2001/0039472 A1 | 11/2001 | Isogai et al. | 701/96 |
| 2002/0026276 A1 | 2/2002 | Hattori et al. | 701/96 |
| 2002/0099491 A1 | * 7/2002 | Akabori et al. | 701/96 |

* cited by examiner

Primary Examiner—Jacques H. Louis-Jacques
(74) Attorney, Agent, or Firm—MacMillan, Sobanski & Todd LLC

(57) ABSTRACT

A vehicle having an adaptive cruise control system with a method for determining an optimum deceleration amount for a host vehicle when approaching an in-path vehicle. This includes determining a relative speed between the vehicles, as well as estimating the deceleration for each. An optimal deceleration estimator calculates the instantaneous amount of deceleration needed to match the host vehicle speed with the in-path vehicle speed at a desired future range between the host vehicle and the in-path vehicle. A deceleration limiter can then use the output from the deceleration estimator to determine an optimum deceleration for the vehicle systems to initiate.

12 Claims, 3 Drawing Sheets

ADAPTIVE CRUISE CONTROL SYSTEM AND STRATEGY

BACKGROUND OF INVENTION

The present invention relates to an adaptive cruise control system, and more particularly to an adaptive cruise control system employing a strategy for determining an optimal amount of deceleration when traveling behind an in-path vehicle.

Cruise control systems for automotive vehicles have been available for years. Typically, for the basic systems, the vehicle driver attains the desired vehicle speed and initiates the cruise control system at a driver selected set speed. The vehicle then travels at the set speed unless the driver applies the brakes or turns off the system.

With advances in vehicle electronics and sensor technology, adaptive cruise control (ACC) systems are becoming available that not only maintain the set vehicle speed, but also include an object sensing technology, such as radar, laser or other type of sensing system, that will detect an in-path vehicle. If the host vehicle is following too closely behind an in-path vehicle, the ACC system will automatically reduce the host vehicle speed (by reducing the throttle and/or applying the brakes) sufficiently to obtain a predetermined safe following interval (which may be based on following distance and/or following time). This deceleration of the host vehicle is also known as the longitudinal response of the ACC system. After reaching its objective, the ACC system will then continue to maintain the safe following interval.

The host vehicle may also be at a greater distance behind an in-path vehicle, but traveling at a higher rate of speed—this requires the ACC system to decelerate the host vehicle so that it is no longer traveling at a higher rate of speed than the in-path vehicle. Some have attempted to control the rate of deceleration with a stand alone gain or a look-up table type of control strategy, but these are generally inadequate for employing with all combinations of relative speed and gap (also called range). For a look-up table, it is difficult to include the full dynamic ranges of both the positive gaps and the negative relative velocities in the adaptive cruise control range. For a stand alone gain, a typical deceleration limit is −0.3 g for the host vehicle or the system may employ this deceleration limit as a function of relative speed, but this does not achieve a smooth host vehicle trajectory for many combinations of relative speed and gap. It is most desirable that the ACC system provide a deceleration that is acceptable to the vehicle occupants—neither overreacting or underreacting when determining the appropriate rate of deceleration for the host vehicle, and providing a relatively smooth transition. Such an ACC system, then, can provide the most comfort to vehicle occupants without creating undue anxiety due to too fast of an approach to an in-path vehicle or too much deceleration when not necessary.

Thus, it is desirable to employ an adaptive cruise control system that employs a strategy for determining and implementing an optimal amount of deceleration, with a smooth speed trajectory, of a host vehicle while traveling behind another vehicle that is in its path.

SUMMARY OF INVENTION

In its embodiments, the present invention contemplates a method of determining an amount of deceleration for a host vehicle having an adaptive cruise control that is following behind an in-path vehicle. The method includes the steps of: determining a speed of the host vehicle and a speed of the in-path vehicle; determining a relative speed between the host vehicle and the in-path vehicle; determining a range between the host vehicle and the in-path vehicle; estimating a deceleration of the in-path vehicle; determining a deceleration of the host vehicle; calculating an instantaneous optimal deceleration amount needed to match the host vehicle speed with the in-path vehicle speed at a desired future range between the host vehicle and the in-path vehicle; and selectively changing the host vehicle deceleration in response to the calculated instantaneous optimal deceleration amount.

The present invention further contemplates a host vehicle having an adaptive cruise control system. The host vehicle includes a host vehicle speed determiner capable of determining a host vehicle speed, and an object detection sensing system capable of detecting an in-path vehicle and estimating a speed of the in-path vehicle, a range from the host vehicle to the in-path vehicle, and a relative speed between the host vehicle and the in-path vehicle. A host vehicle deceleration estimator is capable of estimating a current deceleration of the host vehicle, an in-path vehicle deceleration estimator is capable of estimating a current deceleration of the in-path vehicle, and an optimal deceleration estimator is capable of calculating an optimal deceleration amount based upon calculating an optimal deceleration amount needed to match the host vehicle speed with the in-path vehicle speed at a desired future range between the host vehicle and the in-path vehicle. The host vehicle also includes an adaptive cruise control controller capable of selectively changing the host vehicle deceleration in response to the calculated optimal deceleration amount.

Accordingly an embodiment of the present invention can employ a deceleration strategy in an ACC system that will use the calculated deceleration needed to match the host vehicle speed with the in-path vehicle speed at a final desired gap between the vehicles as the maximum deceleration boundaries of the ACC system.

An advantage of the present invention is that the adaptive cruise control system of the host vehicle can achieve a smooth host speed trajectory behind an in-path vehicle, especially in a case of high negative relative speed.

Another advantage of the present invention is that a desirable amount of deceleration, without generally overreacting or underreacting, is achieved by the adaptive cruise control of the host vehicle.

A further advantage of the present invention is that the adaptive cruise control system achieves an optimal use of the deceleration range to achieve any desired deceleration relative to an in-path vehicle.

DETAILED DESCRIPTION

Figure 1:
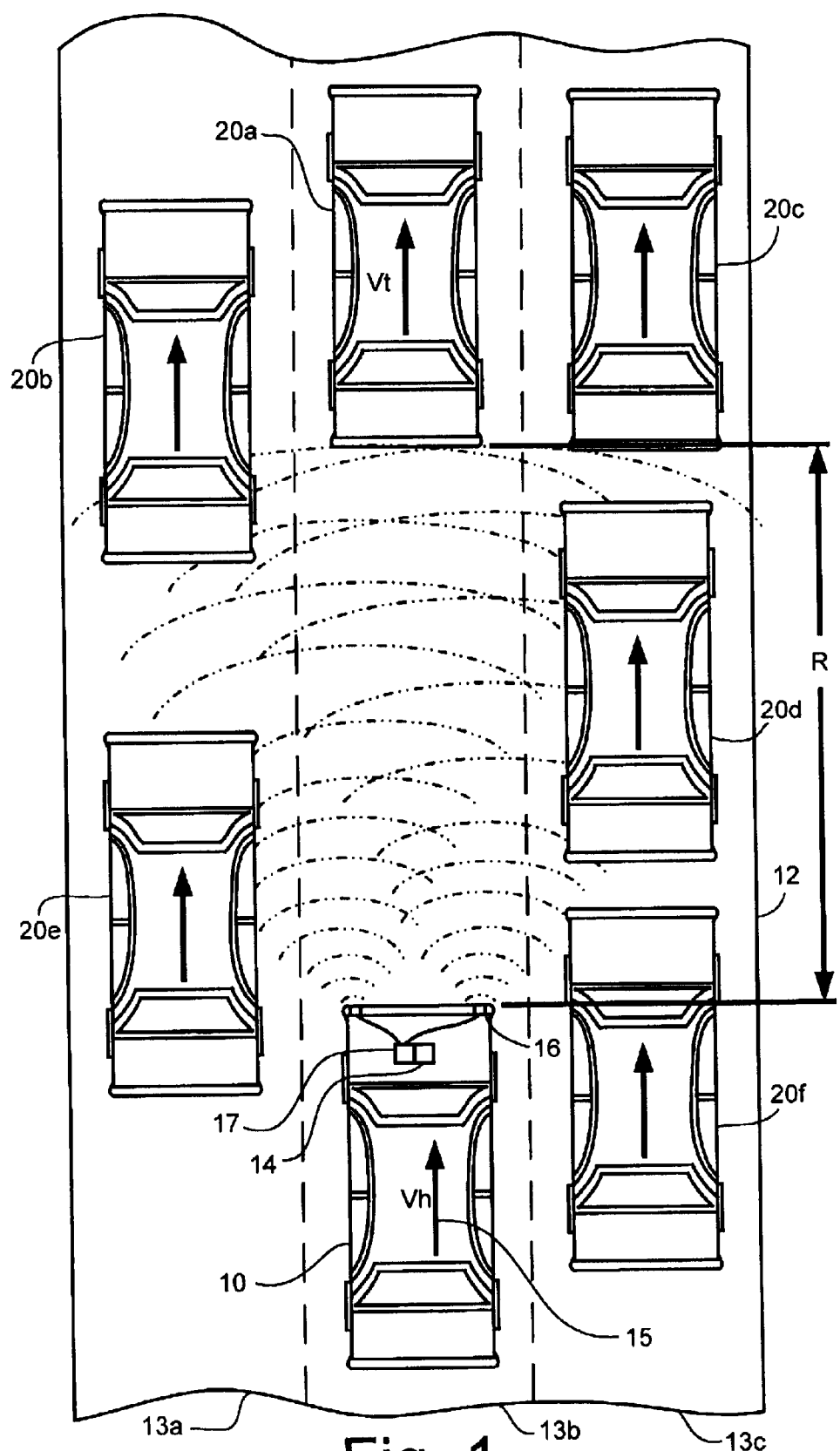
FIG. 1 is a schematic view of an adaptive cruise control equipped vehicle, traveling on a road among other vehicles, in accordance with the present invention.

FIG. 1 illustrates a host vehicle 10 traveling on a road 12, with three lanes 13a–13c, in the direction of arrow 15, at a speed Vh. The host vehicle 10 has an adaptive cruise control (ACC) system 14, connected to an object sensing system 17. The ACC system, object sensing system, and deceleration limiter, discussed below, may be implemented including a programmed general purpose computer, as can be appreciated by those skilled in the art. In the alternative, the controls can be implemented using a special purpose integrated circuit (ASIC), whether separate dedicated ASICs or a single ASIC with a main processor for system level control and separate sections dedicated to performing various specific computations, as well as other types of common dedicated or programmable electronic circuits or devices, as can be appreciated by those skilled in the art.

The object sensing system 17 includes a pair of object sensors 16. These sensors 16 may be radar, laser, or other similar types of sensors able to track the location and distance to objects surrounding the host vehicle 10. In general, the object sensing system 17 determines the relative position of a detected object relative to the host vehicle 10 and the amount of change in the relative position over a time interval. This input can then be used to determine the range (or gap) and the relative speed between the host vehicle 10 and a sensed object.

In this case, the objects are other vehicles 20a–20f, that are adjacent to or in front of the host vehicle 10. The arrows on the surrounding vehicles 20a–20f indicate the general direction of travel for these vehicles. While FIG. 1 shows two sensors 16 on the host vehicle 10, there may be any number of sensors (one or more), as are needed to detect and track one or more vehicles 20a–20f. Vehicle 20a is an in-path vehicle traveling at speed Vt, so the ACC system 14 will attempt to maintain a predetermined following interval (e.g. following distance or time) from the in-path vehicle 20a regardless of the driver set speed for the ACC system 14, if the ACC system 14 is set to a higher speed than the vehicle 20a is traveling.

The range (also called gap) R is the distance from the front of the host vehicle 10 to the rear of the in-path vehicle 20a. The relative speed between the host vehicle 10 and the in-path vehicle 20a is U=Vh−Vt. If the relative speed U is negative at some point in time, then the ACC must decelerate the host vehicle 10 in order to assure that it does not approach too closely to the in-path vehicle 20a.

Figure 2:
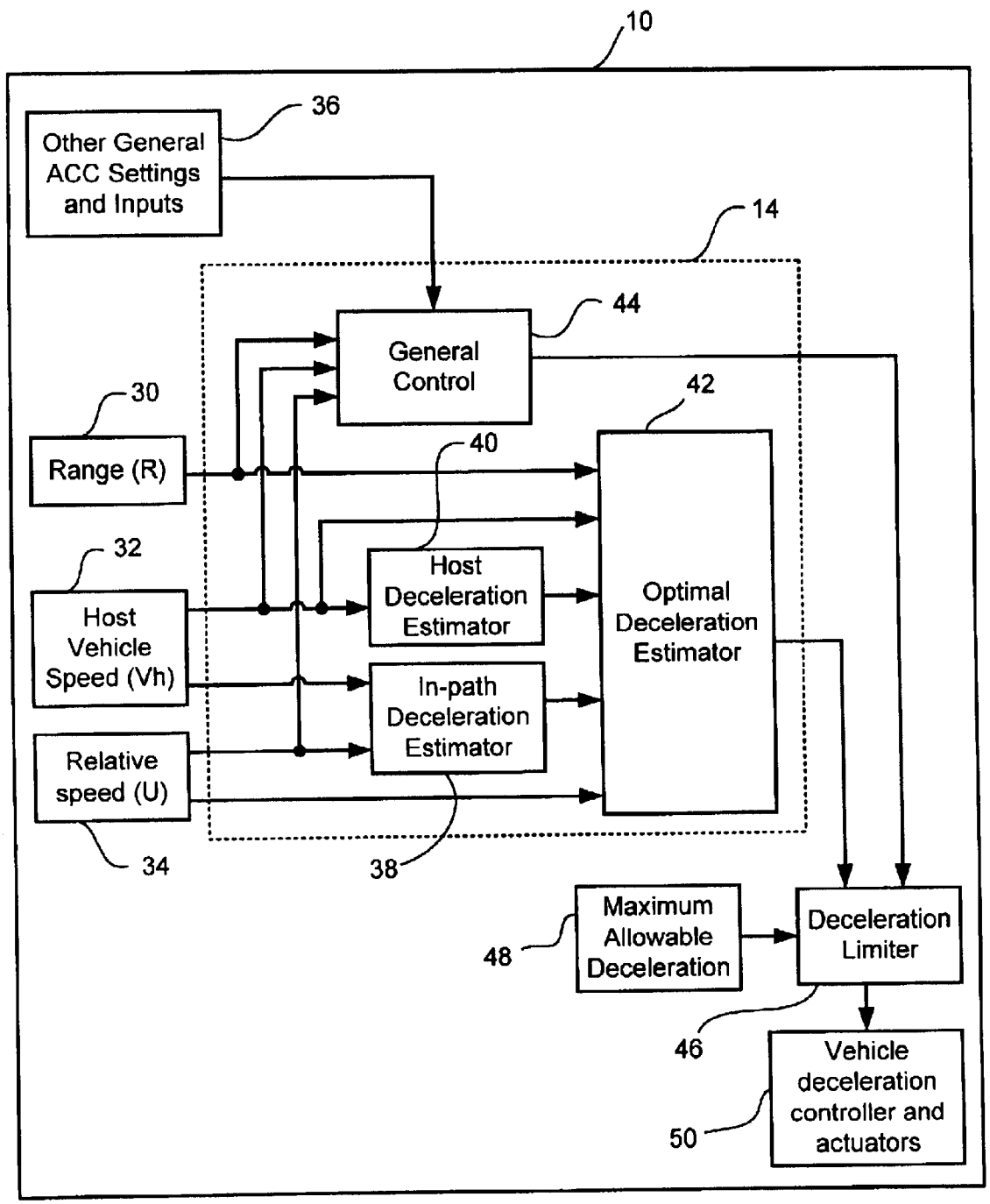
FIG. 2 is a schematic, block diagram of an adaptive cruise control system for a vehicle in accordance with the present invention.

FIG. 2 illustrates a schematic, block diagram of the ACC system 14 in the host vehicle 10. The inputs, from the object sensing system (not shown in FIG. 2) and other vehicle systems (not shown), include the range R, block 30, the host vehicle speed Vh, block 32, the relative speed U, block 34, and other general ACC settings and inputs, block 36. A host vehicle speedometer, or other conventional means, can be used for block 32 to determine the speed Vh of the host vehicle 10, while the object sensing system may determine the range R, block 30, and calculate the relative speed U, block 34, between the two vehicles.

The in-path deceleration estimator, block 38, receives inputs of the relative speed 34 and the host vehicle speed 32, and estimates the current deceleration of the in-path vehicle and predicts it for a future time. The host deceleration estimator, block 40, receives inputs of host vehicle speed 32, and estimates the current deceleration of the host vehicle 10. These estimated deceleration values, along with the range 30, host vehicle speed 32, and relative speed 34, are communicated to an optimal deceleration estimator, block 42.

The optimal deceleration estimator, block 42, calculates the instantaneous amount of deceleration needed by the host vehicle to match the host vehicle speed with the in-path vehicle speed at a desired future range between the two vehicle, as is described in more detail below. The general control, block 44, receives inputs of range 30, host vehicle speed 32, relative speed 34, and other general ACC settings and inputs 36, and calculates a general deceleration based on a simple control law or a look-up table, as is generally known to those skilled in the art.

The output from the general control, block 44 and the optimal deceleration estimator, block 42, are communicated to a deceleration limiter, block 46. A maximum allowable deceleration, block 48, is also communicated to the deceleration limiter 46. The maximum allowable deceleration 48 is the maximum deceleration that the ACC system 14 is allowed to impose on the host vehicle 10. It may be a fixed value, such as for example −0.3 g, or, if so desired, may be a value that varies based upon various current vehicle and environmental conditions. The deceleration limiter 46 will output the general deceleration unless the optimal deceleration is less, in which case the optimal deceleration will overwrite the general deceleration as the deceleration to output, which indicates that the general deceleration value was unnecessarily high. Additionally, both the general deceleration and the optimal deceleration are overwritten by the maximum allowable deceleration, if larger than the current maximum allowable for the ACC system 14.

The deceleration limiter 46 then communicates the desired deceleration to the vehicle deceleration controller and actuators, block 50. The vehicle deceleration controllers and actuators 50 may take the form of engine controllers, brake controllers and actuators, and other mechanisms for controlling the deceleration of a vehicle with ACC, as are known to those skilled in the art.

The methodology employed for the optimal deceleration estimator 42 to determine an optimal rate of deceleration will now be discussed. As mentioned above, the object is to look ahead in time to the final control objective, which is matching the host and the in-path vehicle speeds at a final desired range. Moreover, for the ACC system 14, it is desired to have such an algorithm that achieves this in a closed loop manner. The optimal deceleration estimator 42, then, calculates the optimal deceleration amount based on the following mathematical assumptions and equations. The optimal deceleration is a dynamic quantity and can be derived as follows. Assume that the deceleration model of the host vehicle 10 is in the form of a low pass filter with a time constant $\tau$—in which case the deceleration of the host vehicle 10 can be approximated as $Aa=Ac+(Ar-Ac)*t$, for $0<t<=T$, and $Aa=Ar$, for $t>=T$. For these equations, $\tau$ is a low pass filter time constant, Aa is the actual vehicle deceleration at time t, Ac is a current vehicle deceleration, Ar is the requested vehicle deceleration, and T is $2*\tau$. Also the deceleration Aa of the in-path vehicle 20a is approximated as Al (a constant for all t).

The relative speed U, as a function of time, between the host vehicle 10 and the in-path vehicle 20a is $U(t)=Uo+Al*t-Ac*t-(Ar-Ac)*(t^2/2)$, for $0<t<=T$, and $U(t)=Uo+(Al-Ar)*t-(T/2)*(2-T)*(Ac-Ar)$, for $t>=T$. For these equations Uo is the initial relative speed. Based on these previous equations, then, the range R between the host vehicle 10 and the in-path vehicle is $R(t)=Uo*t+Al*(t^2/2)-Ac*(t^2/2)-(Ar-Ac)*(t^3/6)+Ro$, for $0<t<=T$, and $R(t)=Uo*t+(Al-Ar)*(T^2/2)-((T/2)*(2-T)*(Ac-Ar)*t+(T^2/6)*(3-2*T)*(Ac-Ar)+Ro$, for $t>=T$. For these equations, Ro is the initial range between the vehicles.

The optimal deceleration estimator 42 employs the above equations for U(t) and R(t) to solve for the instantaneous requested deceleration Ar that will result in the host vehicle speed Vh matching the in-path vehicle speed Vt (that is U(t)=0) at a range R(t)=D, with D being a predetermined, desired, future range between the vehicles. This value Ar is communicated to the deceleration limiter 46. These calculations, then, will use the calculated deceleration needed to match the host vehicle speed with the in-path vehicle speed at the final desired gap between the vehicles as the optimal deceleration boundary of the ACC system 14, of course, limited by the maximum allowable deceleration 48, as discussed above.

The value Ar is then the current optimal deceleration amount for the host vehicle 10, and will overwrite the general deceleration being communicated from the general control 44 if it is less than the general deceleration. Both of these values are, of course, limited by the maximum deceleration for the ACC system 14 from the maximum allowable deceleration block 48, which in this particular system example is preferably −0.3 g. As an alternative, this maximum deceleration may be a variable value based upon certain vehicle and environmental conditions, if so desired. The final desired deceleration is then communicated to a vehicle deceleration controller and actuators 50. The criteria of performance optimally is the trajectory smoothness in reaching the final control objective. That is, the deceleration algorithm outputting the optimal desired deceleration.

Figure 3:
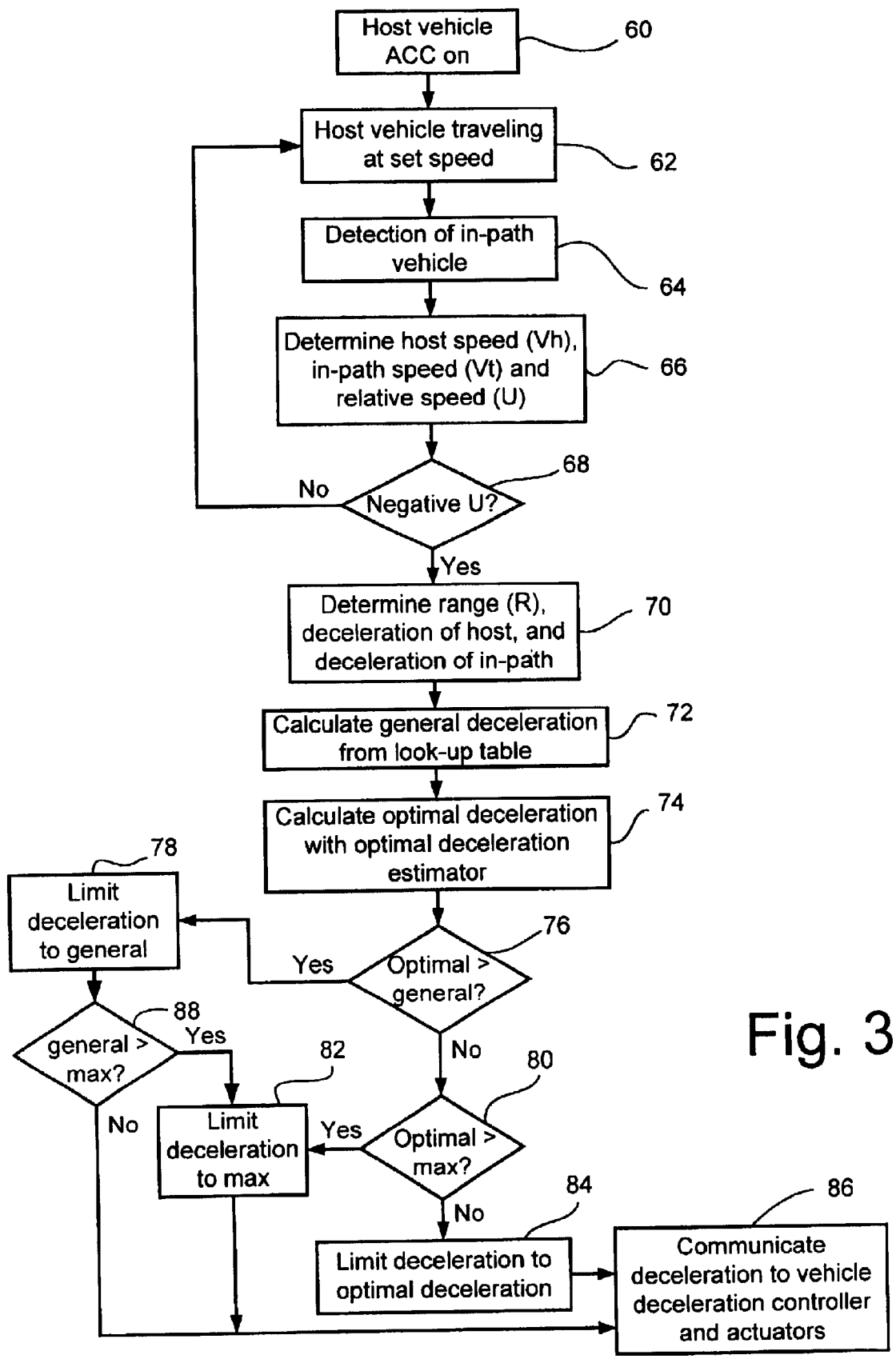
FIG. 3 is a flow chart of the optimal deceleration strategy in accordance with the present invention.

FIG. 3 generally shows a portion of an automatic cruise control process for the host vehicle. The host vehicle is traveling with the ACC system on, block 60, at the driver set speed, block 22. Upon detection of an in-path vehicle that is within the predetermined safe following interval, block 64, the ACC system will determine the host vehicle speed Vh, in-path vehicle speed Vt, and the relative speed U, block 66.

If the relative speed U is not negative, then the host vehicle is currently traveling at an equal or lower speed than the in-path vehicle and does not need to employ the optimal deceleration strategy. If the relative speed U is negative, the range R, the deceleration of the host vehicle, and the deceleration of the in-path vehicle are determined, block 70. A general deceleration is determined from a conventional look-up table, a predetermined fixed gain, or other conventional means if so desired, block 72.

The optimal deceleration estimator calculates an optimal amount of deceleration, block 74. If the optimal deceleration amount is greater than the general deceleration, then the deceleration is limited to the calculated general deceleration, block 78, and compared to the maximum allowed deceleration, block 88. If the general deceleration is greater than the maximum allowed deceleration, then the deceleration is limited to the maximum allowed deceleration, block 82. On the other hand, if the optimal deceleration is not greater than the general deceleration, block 76, then the calculated optimal deceleration is compared to the maximum allowed deceleration, block 80. If the calculated optimum deceleration is greater than the maximum allowed deceleration, then the deceleration is limited to the maximum allowed deceleration, block 82. If not, then the deceleration is limited to the calculated optimal deceleration, block 84. Whatever the deceleration is finally limited to, this is communicated to the vehicle deceleration controller and actuators, block 86, in order to initiate the vehicle operations needed to decelerate the host vehicle. Of course, the optimal deceleration and general deceleration can be continuously recalculated and applied as the host vehicle decelerates to assure that the desired deceleration is maintained until the final objective is attained.

While certain embodiments of the present invention have been described in detail, those familiar with the art to which this invention relates will recognize various alternative designs and embodiments for practicing the invention as defined by the following claims.

What is claimed is:

1. A method of determining an amount of deceleration for a host vehicle having an adaptive cruise control that is following behind an in-path vehicle, the method comprising the steps of:
   determining a speed of the host vehicle and a speed of the in-path vehicle;
   determining a relative speed between the host vehicle and the in-path vehicle;
   determining a range between the host vehicle and the in-path vehicle;
   estimating a deceleration of the in-path vehicle;
   determining a deceleration of the host vehicle;
   calculating an instantaneous optimal deceleration amount needed to match the host vehicle speed with the in-path vehicle speed at a desired future range between the host vehicle and the in-path vehicle;
   determining a maximum deceleration, comparing the calculated instantaneous optimal deceleration amount to the maximum deceleration to determine the smaller deceleration, and selectively changing the host vehicle deceleration to the smaller deceleration;
   calculating a general deceleration;
   comparing the general deceleration to the smaller of the optimal deceleration amount and the maximum deceleration; and
   changing the host vehicle deceleration to the smaller of the compared decelerations.

2. The method of claim 1 wherein the determine maximum deceleration is about −0.3 g.

3. The method of claim 1 wherein the step of calculating the instantaneous optimal deceleration amount includes the steps of solving for the optimal deceleration amount by employing an equation for relative speed as a function of time and an equation for a range as a function of time that will result in the speed of the host vehicle being substantially equal to the speed of the in-path vehicle at the desired future range.

4. The method of claim 3 wherein the equation for the relative speed as a function of time is $U(t)=Uo+Al*t-Ac*t-(Ar-Ac)*(t^2/2)$, for $0<t<=T$, and $U(t)=Uo+(Al-Ar)*t-(T/2)*(2-T)*(Ac-Ar)$, for $t>=T$; and the equation for the range as a function of time is $R(t)=Uo*t+Al*(t^2/2)-Ac*(t^2/2)-(Ar-Ac)*(t^3/6)+Ro$, for $0<t<=T$, and $R(t)=Uo*t+(Al-Ar)*(t^2/2)-(T/2)*(2-T)*(Ac-Ar)*t+(T^2/6)*(3-2*T)*(Ac-Ar)+Ro$, for $t>=T$; with $U(t)=0$ at a range $R(t)=D$; and where $\tau$ is a low pass filter time constant, Aa is the deceleration of the in-path vehicle at time t, Ac is the deceleration of the host vehicle, Ar is the optimal deceleration amount, T is $2*\tau$, the deceleration of the in-path vehicle Aa is approximated as a constant Al, Uo is the determined relative speed between the host vehicle and the in-path vehicle, Ro is the determined range between the host vehicle and the in-path vehicle, and D being the desired future range between the host vehicle and the in-path vehicle.

5. A method of determining an amount of deceleration for a host vehicle having an adaptive cruise control that is following behind an in-path vehicle, the method comprising the steps of:
   determining a speed of the host vehicle;
   determining a relative speed between the host vehicle and the in-path vehicle;
   determining a range between the host vehicle and the in-path vehicle;
   estimating a deceleration of the in-path vehicle;
   determining a deceleration of the host vehicle; and
   calculating an instantaneous optimal deceleration amount needed to match the host vehicle speed with the in-path vehicle speed at a desired future range between the host vehicle and the in-path vehicle by employing an equation for relative speed as a function of time and an equation for a range as a function of time that will result in the speed of the host vehicle being substantially equal to the speed of the in-path vehicle at the desired future range; wherein the equation for the relative speed as a function of time is $U(t)=Uo+Al*t-Ac*t-(Ar-Ac)*(t^2/2)$, for $0<t<=T$, and $U(t)=Uo+(Al-Ar)*t-(T/2)*(2-T)*(Ac-Ar)$, for $t>=T$; and the equation for the range as a function of time is $R(t)=Uo*t+Al*(t^2/$ $2)-Ac*(t^2/2)-Ar-Ac)*(t^3/6)+Ro$, for $0<t<=T$, and $R(t)=Uo*t+(Al-Ar)*(t^2/2)-(T/2)*(2-T)*(Ac-Ar)*t+(T^2/6)*(3-2*T)*(AC-Ar)+Ro$, for $t>=T$; with $U(t)=0$ at a range $R(t)=D$: and where $\tau$ is a low filter time constant, Aa is the deceleration of the in-path vehicle at time t, Ac is the deceleration of the host vehicle, Ar is the optimal deceleration amount, T is $2*\tau$, the rate of deceleration of the in-path vehicle Aa is approximated as a constant Al, Uo is the determined relative speed between the host vehicle and the in-path vehicle, Ro is the determined range between the host vehicle and the in-path vehicle, and D being the desired future range between the host vehicle and the in-path vehicle.

6. The method of claim 5 wherein the step of changing the host vehicle deceleration includes the steps of determining a maximum deceleration, comparing the calculated instantaneous optimal deceleration amount to the maximum deceleration to determine the smaller deceleration, and changing the host vehicle deceleration to the smaller deceleration.

7. The method of claim 6 wherein the determine maximum deceleration is about −0.3 g.

8. The method of claim 5 further including the steps of calculating a general deceleration, comparing the general deceleration to the optimal deceleration, and changing the host vehicle deceleration to the smaller of the compared deceleration.

9. A host vehicle having an adaptive cruise control system comprising:
   a host vehicle speed determiner capable of determining a host vehicle speed;
   an object detection sensing system capable of detecting an in-path vehicle and estimating a speed of the in-path vehicle, a range from the host vehicle to the in-path vehicle, and a relative speed between the host vehicle and the in-path vehicle;
   a host vehicle deceleration estimator capable of estimating a current deceleration of the host vehicle;
   an in-path vehicle deceleration estimator capable of estimating a current deceleration of the in-path vehicle;
   an optimal deceleration estimator capable of calculating an optimal deceleration amount based upon calculating the optimal deceleration amount needed to match the host vehicle speed with the in-path vehicle speed at a desired future range between the host vehicle and the in-path vehicle;
   an adaptive cruise control controller capable of selectively changing the host vehicle deceleration in response to the calculated optimal deceleration amount;
   a maximum allowable deceleration determiner capable of determining a maximum allowable deceleration;
   a deceleration limiter capable of comparing the maximum allowable deceleration and the optimal deceleration amount and selecting a smaller of the two compared decelerations for communicating to the adaptive cruise control controller;
   a general deceleration determiner capable of determining a general deceleration; and
   wherein the deceleration limiter is capable of comparing the general deceleration to the smaller of the optimal deceleration amount and the maximum allowable deceleration, and selecting the smaller deceleration for communicating to the adaptive cruise control controller.

10. The host vehicle of claim 9 wherein the optimal deceleration estimator is capable of solving for the optimal deceleration by employing an equation for relative speed as a function of time and an equation for a range as a function of time that will result in the speed of the host vehicle being substantially equal to the speed of the in-path vehicle at the desired future range.

11. A host vehicle having an adaptive cruise control system comprising:
   a host vehicle speed determiner capable of determining a host vehicle speed;
   an object detection sensing system capable of detecting an in-path vehicle and estimating a speed of the in-path vehicle, a range from the host vehicle to the in-path vehicle, and a relative speed between the host vehicle and the in-path vehicle;
   a host vehicle deceleration estimator capable of estimating a current deceleration of the host vehicle;
   an in-path vehicle deceleration estimator capable of estimating a current deceleration of the in-path vehicle;
   an optimal deceleration estimator capable of calculating an optimal deceleration amount based upon calculating the optimal deceleration amount needed to match the host vehicle speed with the in-path vehicle speed at a desired future range between the host vehicle and the in-path vehicle by employing an equation for relative speed as a function of time and an equation for a range as a function of time that will result in the speed of the host vehicle being substantially equal to the speed of the in-path vehicle at the desired future range; and wherein the equation for the relative speed as a function of time is $U(t)=Uo+Al*t-Ac*t-(Ar-Ac)*(t^2/2)$, for $0<t<=T$, and $U(t)=Uo+(Al-Ar)*t-(T/2)*(2-T)*(Ac-Ar)$, for $t>=T$; and the equation for the range as a function of time is $R(t)=Uo*t+Al*(t^2/2)-Ac*(t^2/2)-(Ar-Ac)*(t^3/6)+Ro$, for $0<t<=T$, and $R(t)=Uo*t+(Al-Ar)*(t^2/2)-(T/2)*(2-T)*(Ac-Ar)*t+(T^2/6)*(3-2*T)*(Ac-Ar)+Ro$, for $t>=T$; with $U(t)=0$ at a range $R(t)=D$; and where $\tau$ is a low pass filter time constant, Aa is the deceleration of the in-path vehicle at time t, Ac is the deceleration of the host vehicle, Ar is the optimal deceleration amount, T is $2*\tau$, the deceleration of the in-path vehicle Aa is approximated as a constant Al, Uo is the determined relative speed between the host vehicle and the in-path vehicle, Ro is the determined range between the host vehicle and the in-path vehicle, and D being the desired future range between the host vehicle and the in-path vehicle; and
   an adaptive cruise control controller capable of selectively changing the host vehicle deceleration in response to the calculated optimal deceleration amount.

12. The host vehicle of claim 11 further including a general deceleration determiner capable of determining a general deceleration; and wherein the deceleration limiter is capable of comparing the general deceleration to the optimal deceleration amount and selecting the smaller of the two compared decelerations for communicating to the adaptive cruise control controller.

* * * * *